Figure 1:
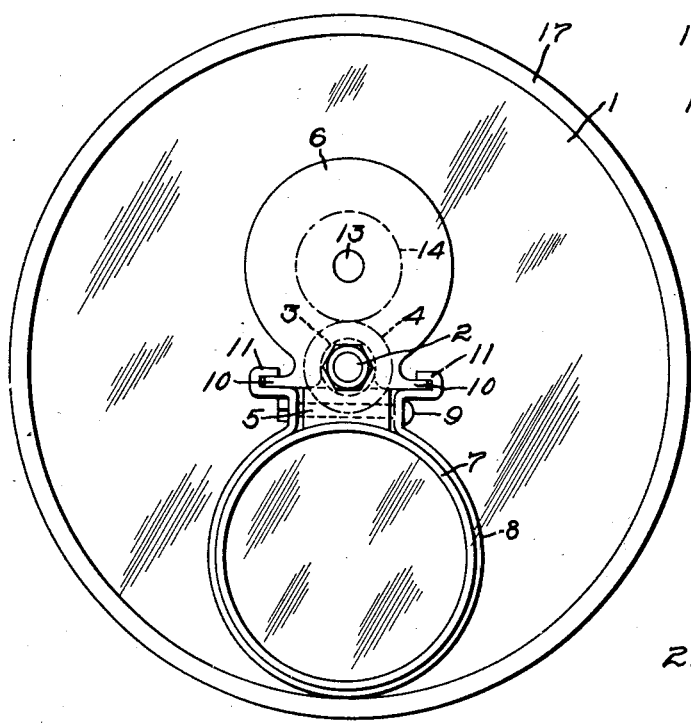

Oct. 6, 1942.   R. G. MacPHERSON   2,298,063
CLEAR VISION DEVICE
Filed April 3, 1940   5 Sheets-Sheet 1

Inventor:
Roy G. MacPherson,

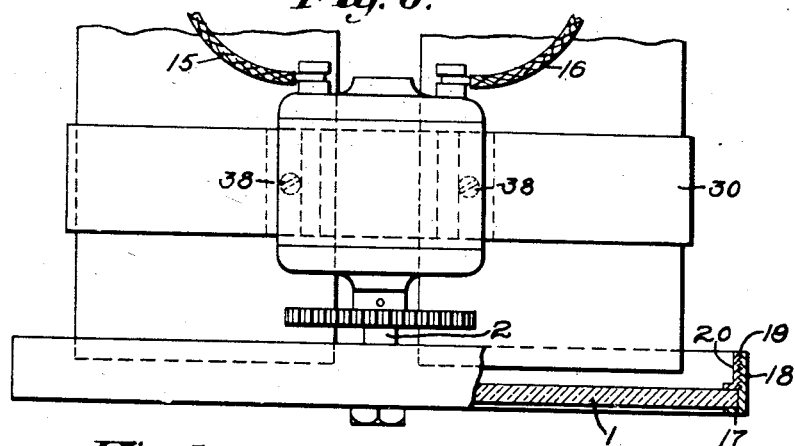
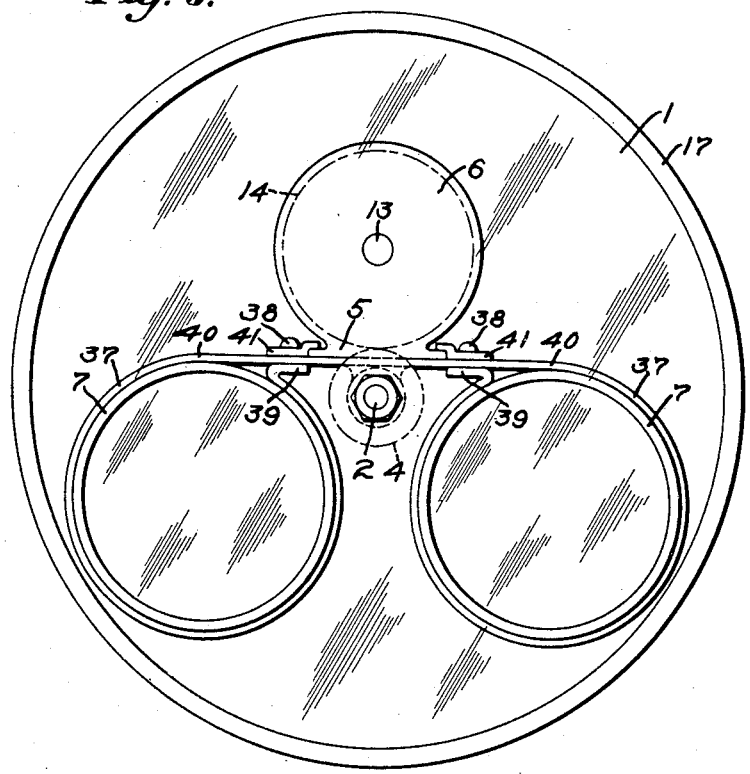
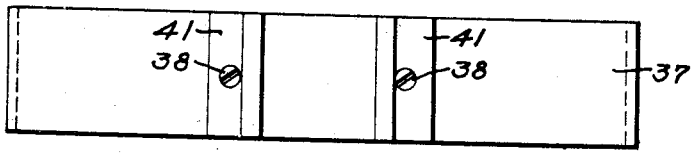

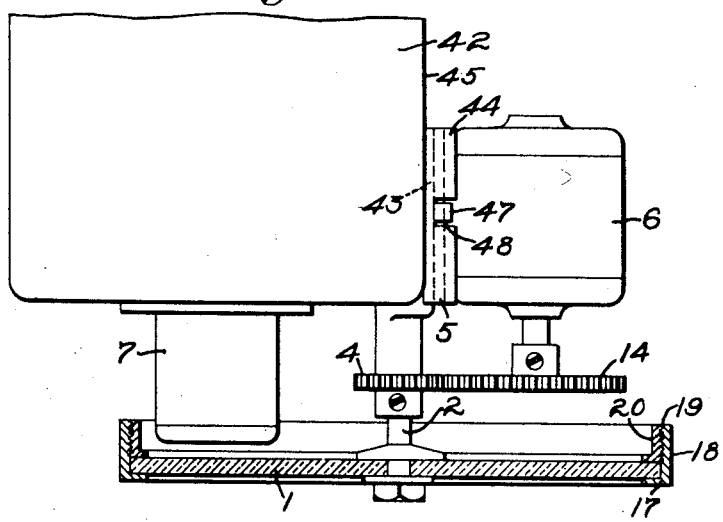
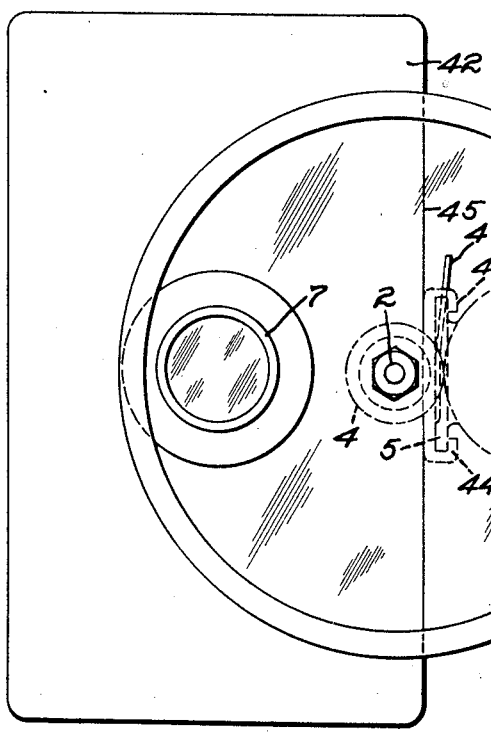
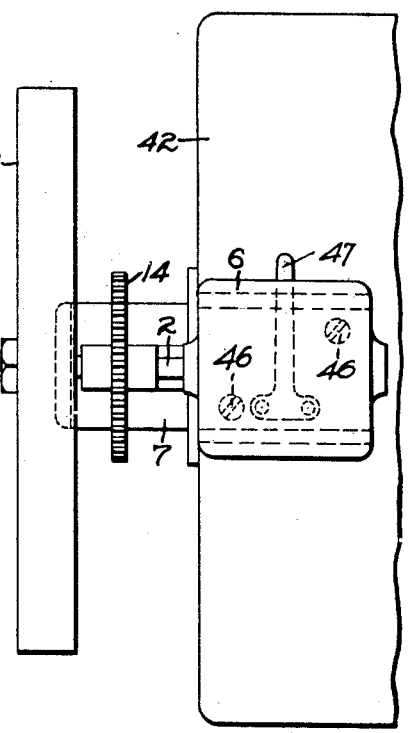
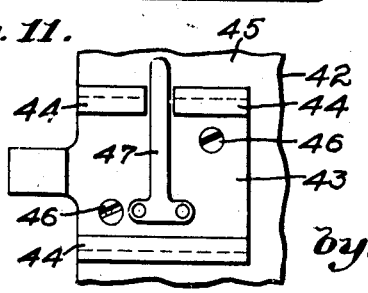

Oct. 6, 1942.                R. G. MacPHERSON                2,298,063
                              CLEAR VISION DEVICE
                         Filed April 3, 1940          5 Sheets—Sheet 4
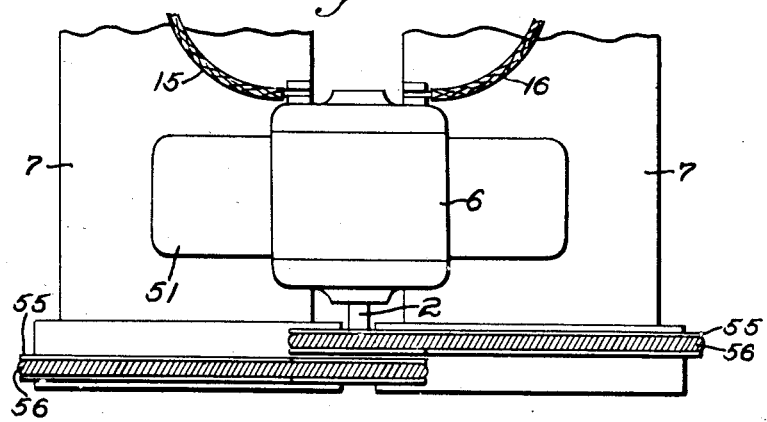
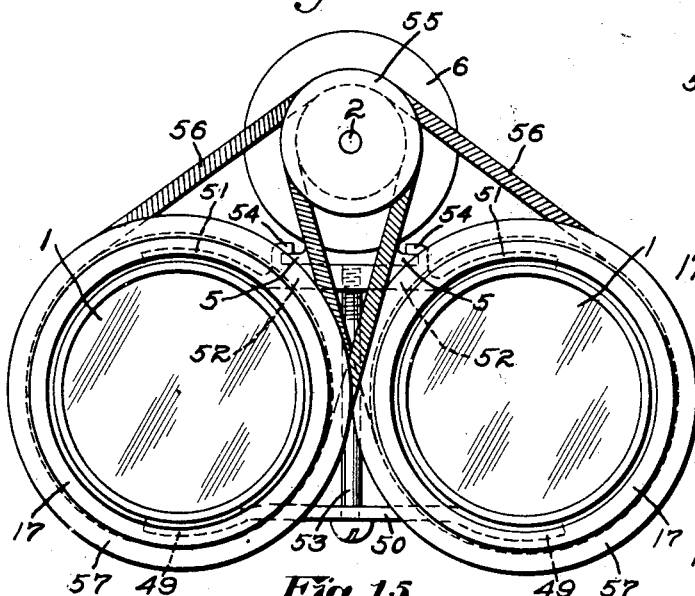
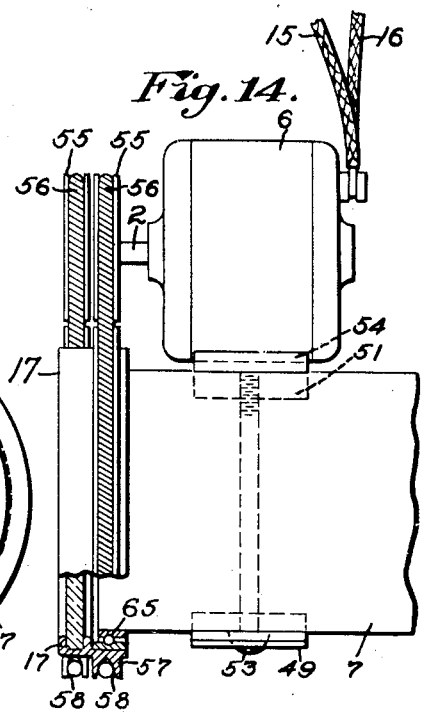
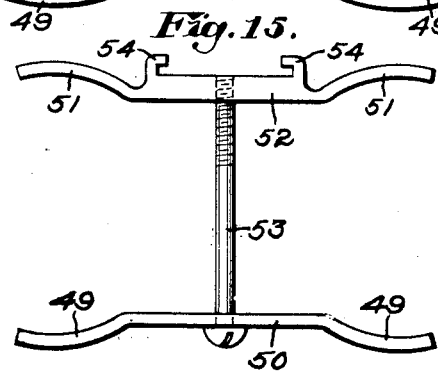
Inventor:
Roy G. MacPherson, Oct. 6, 1942.   R. G. MacPHERSON   2,298,063
CLEAR VISION DEVICE
Filed April 3, 1940   5 Sheets-Sheet 5
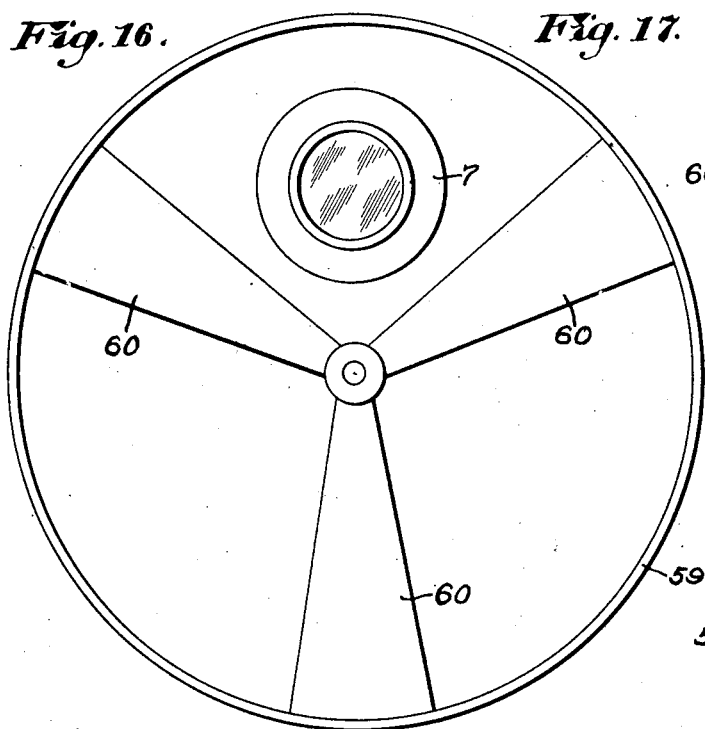
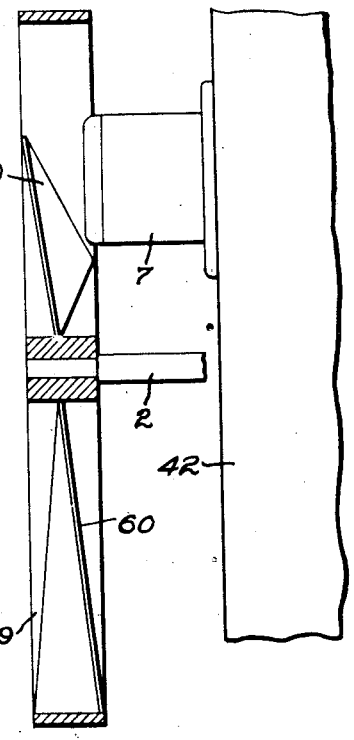
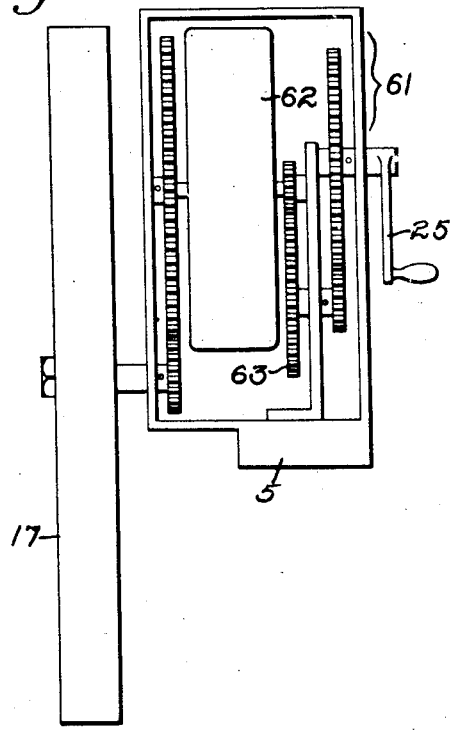
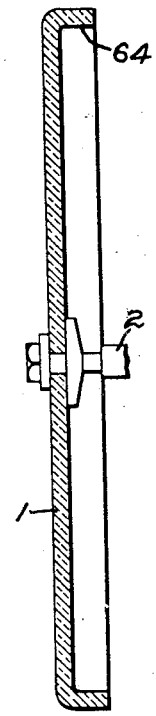
Inventor:
Roy G. MacPherson, Patented Oct. 6, 1942

2,298,063

UNITED STATES PATENT OFFICE 2,298,063

CLEAR VISION DEVICE

Roy G. MacPherson, Framingham, Mass.

Application April 3, 1940, Serial No. 327,673

7 Claims. (Cl. 88—1)

This invention relates to optical systems generally, including telescopes, binoculars, cameras, surveying instruments, etc., and more particularly to a device adapted to provide clear vision through the lenses of instruments embodied in such systems by intercepting, dissipating or removing the moisture caused by rain, snow and fog, as well as dust, from the lens of the instrument, and by preventing the condensation, impinging, or collecting of the same thereon, and thereby providing clear vision, so far as the condition of the lens is concerned.

Figure 2:
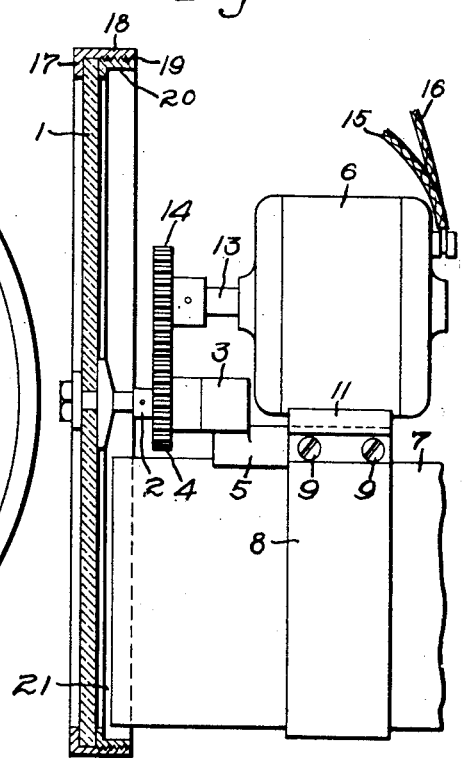
Figure 3:
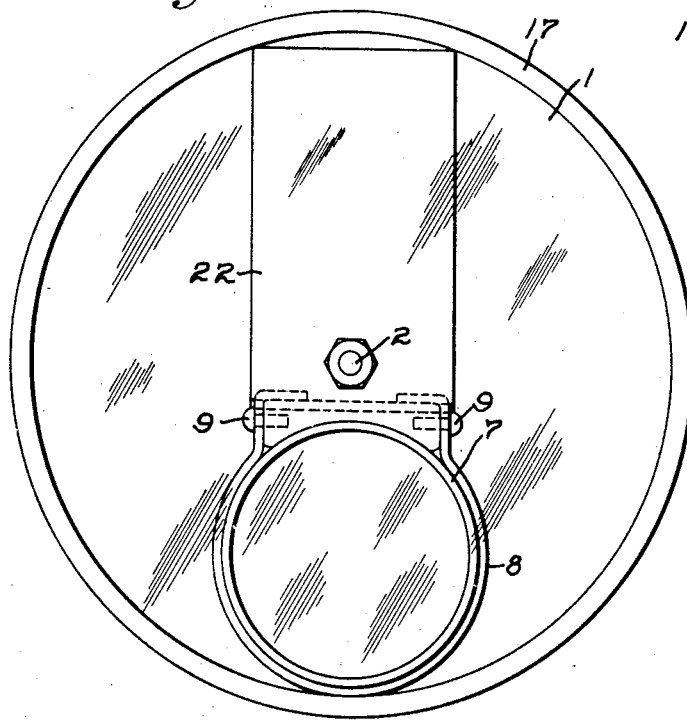
Figure 4:
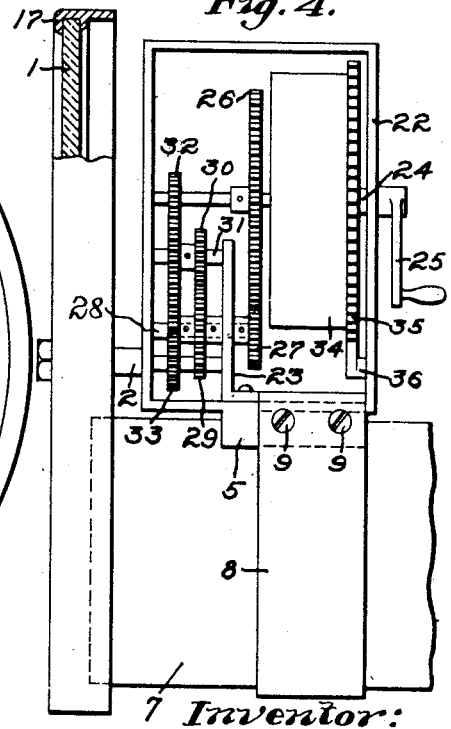

In the drawings of the embodiments of my invention selected for illustration and description herein:

Fig. 1 is a front elevation of the clear vision device mounted, herein as by a band, upon a telescope;

Fig. 2, a side elevation of the same from the right, Fig. 1; partly in section;

Fig. 3, a front elevation of a modified form of construction, including a different type of disk-rotating means;

Fig. 4, a side elevation of the same from the right, Fig. 3;

Fig. 5, a front view of a modified form of the device adapted for use with a binocular or field glass;

Fig. 6, a plan of the same;

Fig. 7, a plan of the disk-rotating motor mounting of the device on the lens barrels;

Fig. 8, a modified form of the device, adapted for use with a camera, shown in a plan view, partly in section;

Fig. 9, a front elevation of said device upon a camera;

Fig. 10, a side elevation of the same, from the right, Fig. 9;

Fig. 11, a detail side view from the right, Fig. 9, of the mounting plate for the motor on the side of the camera;

Fig. 12, a front elevation of a modified form of lens-clearing disk operating means;

Fig. 13, a plan of the same;

Fig. 14, a side elevation from the right, Fig. 12;

Fig. 15, a front view of the mounting shown in Fig. 12 for the moisture intercepting disks;

Fig. 16, a face view of a modified form of moisture dissipating element;

Fig. 17, an edge view of the same, partly in section;

Fig. 18, a side elevation of a further modified form of disk driving means; and

Fig. 19, a view of a modified form of moisture dispelling disk in vertical section.

Users of optical systems of various kinds, including cameras, have long been greatly hampered by the difficulty, and even impossibility, so often encountered, of obtaining a clear vision for the use of various types of such instruments on days when rain is falling, or when the air is full of moisture from fog or snow, or flying spray in marine or other conditions, and the moisture, or perhaps dust, covers the lens.

The present novel device, which has been found extremely valuable for avoiding that trouble, comprises a moisture-dissipating or removing disk of transparent material, as glass, Cellophane, clear Bakelite, etc., which is adapted to be rotated at high speed a short distance in advance of the lens and eccentrically or non-coaxially thereof and thereby, through the rotary motion imparted to the air adjacent the lens of the optical system, as well as the result of the centrifugal force generated on the disk, prevents the condensation or collection of moisture from the air on the lens. This is accomplished both by blowing the moisture laden air away from and not circularly over the lens by means of the free passage between the opposite edges of the lens and laterally across the adjacent faces of the disk and lens, and drying any moisture thereon, and shielding the lens, the revolving disk itself catching all moisture and dust driven toward the lens and immediately throwing it off laterally or tangentially by centrifugal force.

In the present embodiment of my invention, Figs. 1, 2, a thin, transparent, moisture-removing disk 1, as of glass or other material, is mounted eccentrically or non-coaxially relative to the optical system upon a driving shaft 2 in a bearing 3, and which shaft carries a pinion 4 on the base 5 of a suitable motor 6, which may be electric, spring-actuated, manually or air driven, in this instance the first named, its base 5 being secured in position on the barrel 7 of a telescope by a band 8 about the same, with locking screws 9 therefor, which cause flanges 10 of the motor base 5 to be engaged by inwardly-extended flanges 11 on the ends of the band 8, and locked thereby about the barrel 7 of the instrument, the driving means thereby being readily demountable and mountable.

The motor shaft 13 carries a pinion 14, in mesh with the pinion 4 described, on the shaft 2, in the bearing 3 on the base 5, and thereby rotates the disk.

Wires 15, 16, lead from the motor to a suitable battery not shown, which may be conveniently carried in one's pocket, or attached to the instrument, or any suitable other support, or by a tap connection to any suitable source of electricity.

The disk 1 is, in this case, preferably, Fig. 2, provided with a rim-like collar 17, and a flange 18, of course, may be spun on, or attached in any of the common methods, as for instance, shown in Fig. 2, or, Fig. 6, the collar 17 may have its wide flange 18 threaded on its inner face at 19 to receive a threaded locking ring 20, by which the disk 1 has securely mounted to it the ring and collar, forming a rim for the disk, and thus, as the collar flange 18 overlaps rearwardly the edge of the disk, rain, spray, fog and dust are largely prevented from entering the area between the disk and lens 21 in the adjacent end of the barrel 7, as of a telescope.

In Figs. 3, 4, is shown a modified form of driving means for operating the disk, as by a spring motor. The base 5, locked to the barrel as described above, carries a frame 22 with a post 23, in which is mounted the disk shaft 2, and driving means.

On the right-hand side of the frame is mounted a spring-winding shaft 24, with a handle 25, which shaft has a gear 26 thereon, in mesh with a pinion 27 on the post 23 and shaft 28, which shaft carries a larger gear 29 in mesh with a pinion 30 on a shaft 31 on post 23 and frame 22, and which shaft carries also a gear 32 in mesh with a pinion 33 on the inner end of shaft 2, and constituting a chain gear winding means for the spring 34, and also a speed accelerating device to rotate the disk 1 at the desired high speed, when the ratchet 35 on shaft 24 is released by the pawl 36.

In Figs. 5, 6, is shown a further modification of the device, as applied to a pair of field glasses, or binoculars.

The construction is practically the same as that shown in the Figs. 1, 2, for a telescope, except that in the case of the field glass, the motor mounting bands 37 are preferably, for steadiness, locked about both barrels 7 of the glass by screws or the like 38 on the strap ends 39 of the strap body 40 at either side of the instrument, and said screws also engage the strap clamp irons 41, which engage the opposite edges of the base 5, and fasten it securely.

In Figs. 8 to 11 is shown the clear vision device mounted upon a camera, as a conventional, so-called "movie" camera 42, although it might be as readily mounted upon a still camera.

In this case, Figs. 8, 11, a base plate 43, with inturned flanges 44 on its upper and lower edges, is secured to the side wall 45 of the camera 42 near its forward end, by any convenient means, as by screws 46, and the motor base flanges 5 slide forwardly beneath the plate flanges 44, and the base is held firmly in position by a spring 47 on the plate 43, which spring, drawn inwardly temporarily, permits the motor base 5 to slide along beneath the flanges 44 into position, and until a slot on the base 5, not shown, reaches a slot 48 in the flange 44, when the spring 47 moves automatically forward through the slot 48 and locks the base firmly in position beneath the flanges, Fig. 11.

In Figs. 12, 13, 14, is illustrated a modified form of the invention, as applied to a field glass, and wherein there are provided axially of the barrels two rotating disks 1, for the two objective lenses, with collars 17 of either type, as described. In this case, Fig. 15, each lens barrel 7 is clamped between a lower jaw 49, on a plate 50, and an upper jaw 51 of a similar plate 52 by a screw 53, and the upper plate is provided with overlying, inwardly-turned clamping edges 54, which engage the side edges 5 of the motor 6, securely locking the motor in position, the shaft 2 of which carries pulleys 55, Fig. 12, over which travel two cords or belts 56 to rotate the disks 1. Obviously, one cord may be used for both disks, if preferred, and the disks may be rotated in the same or different directions, if desired.

In this case, each disk collar 57 has, on its outer face, a groove 58, in which the cord 56 rests, or the belts or belt may engage hub pulleys in the axis of each disk 1, when they are a substantial distance apart, as in the case of a binocular for astronomical work, or stereoscopic camera, as in that case the pulleys would not seriously interfere with one's vision.

In Figs. 16, 17 is shown a form of moisture-repelling member in the form of a fan 59, with two or more blades 60, instead of the disk, which works satisfactorily, as it rotates at such high speed that it does not interfere with the sight of the object, and only reduces the amount of light transmitted through it by a small percentage, but still prevents flying particles from reaching the lens.

In Fig. 18 is shown a manually operated driving means 61 for the disks, wherein the spring is omitted and a suitable fly wheel 62 is driven directly by the handle 25 at high speed through proper gearing 63, and the disk or disks will run for a substantial period of time by virtue of the stored-up energy in the fly-wheel without continued turning by the handle.

Fig. 19 shows a disk 1, made of any suitable material, with the edge moulded or otherwise inturned to provide a flange 64, as described in line 15, page 4. While I have shown herein the rim of the disk as inturned therewith, it is obvious that the disk may be made, if desired, of moulded composition, such as clear Bakelite or the like, or of Cellophane, or any suitable material.

In instances such as illustrated in Figs. 12 and 14, the barrels of the glasses and the disk rims may be provided with roller bearings 65, if desired, to steady the rotations of the disks 1.

My invention is not limited to the precise construction shown herein, but may be modified in many details, without departing from the spirit of the claims, and within the scope thereof.

I claim:

1. A clear vision device comprising a base, a motor thereon, means for operating said motor, an optical system, including a lens barrel provided with lenses mounted on the base, and a rotatable transparent moisture-intercepting disk-like member driven by said motor and eccentrically mounted relative to said lenses, whereby moisture and foreign matter are driven radially from said lenses.

2. A clear vision device comprising a base, a motor thereon, means to connect the motor to a source of energy, an optical system including a lens barrel with lenses strapped to the base, a rotatable transparent, moisture-intercepting disk-like member mounted on the base axially above the barrel and forming with the lens a radial, uninterrupted air passage across and between the disk and lens faces, whereby moisture and foreign matter are driven laterally from the lens.

3. A clear vision device comprising an optical system including a telescope, a base thereon, means to strap the barrel of the telescope adjustably to the base, a transparent, rotatable moisture-intercepting means mounted on and above the base, axially eccentric to the telescope lens, a manually operated motor, and speed accelerating means on the base to rotate said moisture-intercepting member relative to the telescope lens so as to prevent moisture from accumulating on the telescope lens.

4. A clear vision device comprising a base, a motor on the base, means to operate said motor, an optical system including lens barrels with lenses mounted on and below said base, and a rotatable transparent moisture-intercepting disk-like member driven by said motor, said disk-like member being eccentrically mounted relative to the face of either lens whereby moisture is prevented from accumulating on the lenses.

5. A clear vision device comprising an optical system including a lens barrel with lenses, a base above said barrel, a motor on the base axially off center relative to the lens, and a transparent moisture-intercepting disk-like member, rotatable by the motor, said disk-like member being mounted axially eccentric to the lenses, whereby moisture and foreign matter are driven radially from said lenses.

6. A clear vision device comprising a base, a motor mounted thereon, an optical system including a housing, a barrel with lenses therein, and means on said housing for adjustably securing said base to said housing, and a rotatable transparent moisture intercepting disk-like member carried by the base axially eccentric to the lenses, whereby moisture and foreign matter are driven radially from said lenses.

7. A clear vision device comprising a base, a motor thereon, means to connect the motor to a source of energy, an optical system including a motion picture apparatus with lenses, a housing therefor with a base plate on its side wall to receive the motor and base, and a transparent moisture-intercepting disk-like member carried by the base axially eccentric to the lens, said disk-like member being rotated by the motor in a radial path across the optical path of the lens, whereby the moisture is prevented from accumulating on the lens.

ROY G. MacPHERSON.